United States Patent [19]
Hori et al.

[11] Patent Number: 5,482,086
[45] Date of Patent: Jan. 9, 1996

[54] HOSE WITH INTERMEDIATE COUPLING

[75] Inventors: Tadayoshi Hori; Terumitsu Oshima; Satoshi Mizutani; Masanori Kumazaki, all of Aichi, Japan

[73] Assignee: Toyoda Gosei Co., Ltd., Japan

[21] Appl. No.: 274,729

[22] Filed: Jul. 18, 1994

[51] Int. Cl.⁶ ................................. F16L 33/00
[52] U.S. Cl. ................ 138/103; 138/109; 285/256
[58] Field of Search ................. 138/103, 109, 138/137; 285/256, 259, 62, 56

[56] References Cited

U.S. PATENT DOCUMENTS

| | | | |
|---|---|---|---|
| 4,650,223 | 3/1987 | Miyazaki et al. | 285/256 X |
| 4,657,285 | 4/1987 | Akiyama et al. | 138/103 X |
| 4,674,719 | 6/1987 | Tanioka et al. | 285/62 X |
| 4,762,150 | 8/1988 | Kokuryu | 138/44 |
| 4,792,109 | 12/1988 | Hattori | 285/256 X |
| 5,040,830 | 8/1991 | Atkinson | 138/109 X |
| 5,052,722 | 10/1991 | Kubo et al. | 285/256 X |
| 5,199,751 | 4/1993 | Beagle et al. | 285/256 |
| 5,207,460 | 5/1993 | Oetiker | 285/256 X |
| 5,358,012 | 10/1994 | Kish | 138/109 |

FOREIGN PATENT DOCUMENTS

| | | |
|---|---|---|
| 5386621 | 12/1951 | Japan . |
| 5531025 | 8/1953 | Japan . |
| 58-61993 | 4/1983 | Japan . |
| 61-62692 | 3/1986 | Japan . |
| 62-49092 | 3/1987 | Japan . |
| 315066 | 2/1991 | Japan . |

Primary Examiner—David Scherbel
Assistant Examiner—Patrick F. Brinson
Attorney, Agent, or Firm—Cushman Darby & Cushman

[57] ABSTRACT

A hose with in intermediate coupling which is capable of optimally holding a nipple at a regular position corresponding to a sleeve by caulking the sleeve, in which a pair of inclined surfaces 4a, 4b are arranged so as to correspond to two positions 2a, 2b at which a sleeve is caulked, the inclined surfaces 4a, 4b making small outer diameter portions and a large outer diameter portion of a nipple 4 contiguous. As a result of the construction, forces $F_1$, $F_2$ for caulking the sleeve are transformed into forces $f_1$, $f_2$ being opposed to each other, and the balance of these two forces $f_1$, $f_2$ causes the nipple 4 to move to a regular position corresponding to the sleeve. Even after the sleeve has been caulked, stresses remaining in a hose at the two positions are received by the pair of inclined surfaces 4a, 4b, which are like the sides of a truncated cone, so as to confront the inclined surfaces, thereby blocking further movement of the nipple.

6 Claims, 2 Drawing Sheets

HOSE WITH INTERMEDIATE COUPLING

BACKGROUND OF THE INVENTION

This invention relates to a hose with an intermediate coupling such as a brake hose with an intermediate coupling.

For example, a brake hose with an intermediate coupling includes: a coupling portion; a cylindrical sleeve extending from at least one end of the coupling portion; a hose inserted into the sleeve; and a substantially cylindrical nipple inserted into a center hole of the hose at a position corresponding to the sleeve. The sleeve is fastened to the hose while caulked in the radial direction and thereby interposing the hose with the nipple. The thus obtained brake hose with an intermediate coupling is used with the coupling portion thereof being fixed to the body of a motor vehicle by a bolt or the like.

In such an intermediate coupling, the outer diameter of the nipple is generally set to a value substantially equal to the inner diameter of the hose to facilitate the insertion of the nipple into the center hole of the hose. However, if this makes the nipple held by the hose with a gap interposed therebetween, it is difficult to obtain a sufficient fastening force even after the sleeve has been caulked in the radial direction. As a result, a high pressure applied to the oil within the hose may displace the nipple from the position corresponding to the sleeve, causing the nipple to move within the hose. In this case, if the nipple comes off the coupling portion and sleeve, the hose moves within the sleeve along the length of the sleeve, and such movement of the hose may interfere with other parts fixed to the body of the motor vehicle.

To overcome this problem, the outer surface of the nipple has been grooved so that the area of contact of the nipple with the hose can be increased to permit simple insertion of the nipple into the hose with a comparatively satisfactory fastening force (Japanese Utility Model Unexamined Publication Sho-55-31025, Japanese Patent Postexamined Publication Hei-3-15066).

However, even if the outer surface of the nipple is grooved, the nipple may, in some cases, move, although only slightly, within the hose from a regular position corresponding to the sleeve depending on the positions at which the sleeve is caulked in the radial direction.

SUMMARY OF THE INVENTION

The object of the device is to provide a hose with an intermediate coupling which is capable of optimally holding a nipple at a regular position corresponding to a sleeve by caulking the sleeve.

To achieve the above object, the device is applied to a hose with an intermediate coupling, which has a coupling portion, a cylindrical sleeve extending from at least one end of the coupling portion, a hose inserted into the sleeve, and a cylindrical nipple inserted into a center hole of the hose at a position corresponding to the sleeve. The sleeve is fastened to the hose while caulked in the radial direction at two positions and thereby interposing the hose with the nipple. In such hose with an intermediate coupling, the nipple has small outer diameter portions and a large outer diameter portion whose diameter is larger than those of the small outer diameter portions; the small outer diameter portions and the large outer diameter portion are made contiguous by inclined surfaces, which are like the sides of a truncated cone; and the inclined surfaces are formed into a pair so as to correspond to the two positions.

The hose with an intermediate coupling of the device has a pair of inclined surfaces that make the small outer diameter portions and large outer diameter portion of the nipple contiguous so as to correspond to the two positions at which the sleeve is caulked. As a result of this construction, forces applied to the two positions at which the sleeve is caulked are transformed into two forces by the pair of inclined surfaces, the two forces being opposed to each other, and the balance of these two forces causes the nipple to move to a regular position corresponding to the sleeve. Even after the sleeve has been caulked, stresses remaining in the hose at the two positions are received by the pair of inclined surface, which are like the sides of a truncated cone, so as to confront the inclined surfaces, thereby preventing further movement of the nipple.

DETAILED DESCRIPTION OF PREFERRED EMBODIMENTS

Embodiments 1 and 2 of the device will now be described with reference to the drawings.

Embodiment 1

Figure 2:
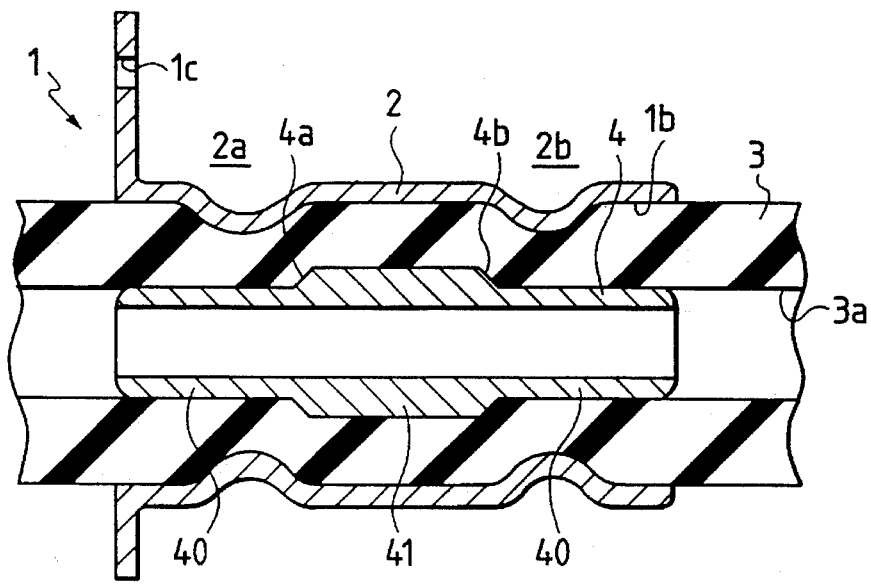
FIG. 2 is a sectional view of the brake hose with an intermediate coupling of FIG. 1.

As shown in FIG. 2, a brake hose with an intermediate coupling includes: a coupling portion 1 having a sleeve 2 unitized therewith; a hose 3 inserted into the sleeve 2; and a cylindrical nipple 4 inserted into a center hole 3a of the hose 3 at a position corresponding to the sleeve 2.

Figure 1:
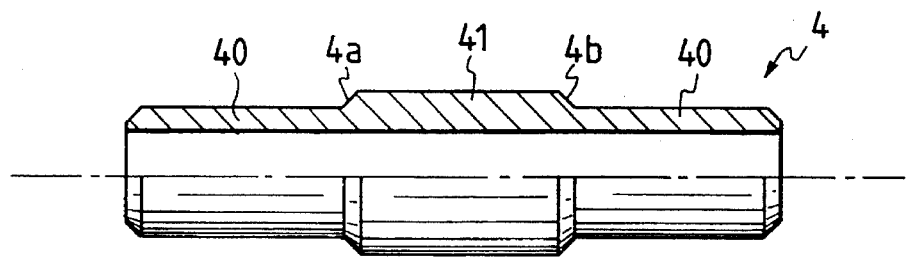
FIG. 1 is a partially sectional side view showing a nipple applied to a brake hose with an intermediate coupling, which is a first embodiment of the device.

The nipple 4 characterizes this embodiment. As shown in FIG. 1, the nipple 4 includes: small outer diameter portions 40 on both ends; and a large outer diameter portion 41 whose outer diameter is larger than those of the small outer diameter portions 40. The large outer diameter portion 41 is located between the small outer diameter portions 40. The small outer diameter portions 40 and the large outer diameter portion 41 are made contiguous by inclined surfaces 4a, 4b, which are like the sides of a truncated cone. As shown in FIG. 2, the respective inclined surfaces 4a, 4b are arranged so as to correspond to positions 2a, 2b at which the sleeve 2 is caulked.

Figure 3:
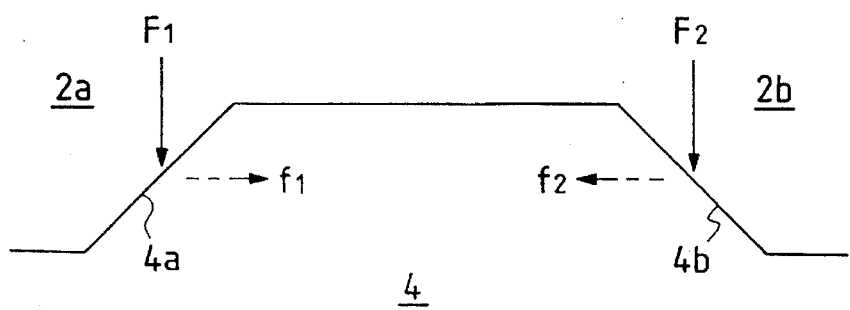
FIG. 3 is a schematic diagram showing a condition at the time of caulking a sleeve in the brake hose with an intermediate coupling of FIG. 1.

This brake hose with an intermediate coupling is fabricated in the following way. The nipple 4 is inserted into the center hole 3a of the hose 3. Then, the coupling portion 1 having the cylindrical sleeve 2 on one end thereof is prepared, and the hose 3 with the nipple 4 already inserted is inserted into a hose hole 1b. In this operation, the nipple 4 within the hose 3 is positioned so as to correspond to the sleeve 2. The sleeve 2 is thereafter caulked using a two-head caulking tool. At this time, the inclined surfaces 4a, 4b correspond to the sleeve 2 caulking positions 2a, 2b, respectively, as shown in FIG. 3. Forces $F_1$, $F_2$ at the two sleeve caulking positions are transformed into two forces $f_1$, $f_2$ that are directed toward each other by the pair of inclined surfaces 4a, 4b, and by the balance of these two forces, the nipple 4 is moved to the regular position corresponding to the sleeve 2 even if the nipple 4 is slightly displaced because the nipple 4 has not been inserted to the regular position. Even after the sleeve 2 has been caulked, stresses remaining in the hose 3 at the two positions are received by the inclined surfaces 4a, 4b, which are like the sides of a truncated cone, so as to confront the inclined surfaces, thereby preventing further movement of the nipple 4. Accordingly, the sleeve 2 interposes the hose 3 with the nipple 4.

Therefore, the obtained brake hose with an intermediate coupling can hold the nipple 4 optimally at the regular position corresponding to the sleeve 2 by caulking the sleeve 2.

This brake hose with an intermediate coupling is used with the coupling portion 1 thereof fixed to the body of a motor vehicle by a bolt inserted to a bole hole 1c. Since the nipple 4 is held at the regular position securely, there is no likelihood that the nipple 4 will come off the coupling portion 1 having the sleeve 2, nor will the hose interfere with other parts fixed to the body of the motor vehicle.

Embodiment 2

Figure 4:
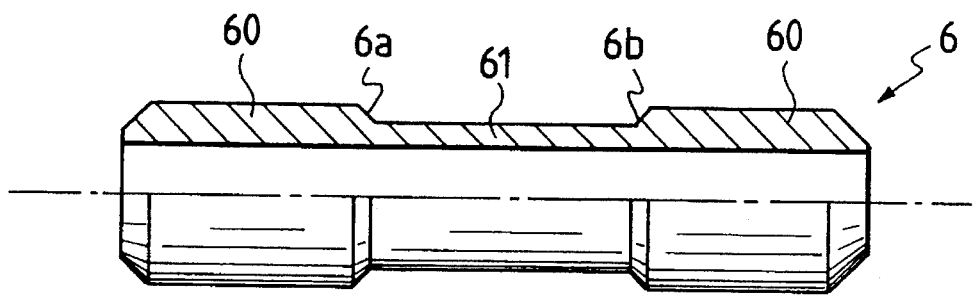
FIG. 4 is a partially sectional side view showing a nipple applied to a brake hose with an intermediate coupling, which is a second embodiment of the device.

A brake hose with an intermediate coupling is characterized as employing a nipple 6 shown in FIG. 4. Since other structural aspects of this embodiment are the same as Embodiment 1, the same parts and components are designated by the same reference numerals and the descriptions thereof will be omitted.

Figure 5:
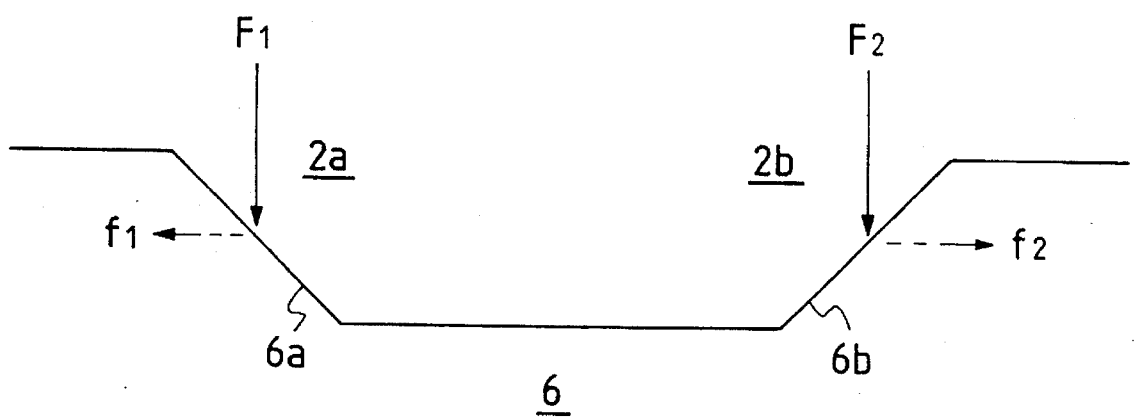
FIG. 5 is a schematic diagram showing a condition at the time of caulking a sleeve in the brake hose with an intermediate coupling of FIG. 4.

The nipple 6 includes: large outer diameter portions 60 on both ends; and a small outer diameter portion 61 whose outer diameter is smaller than those of the large outer diameter portions 60. The small outer diameter portion 61 is located between the large outer diameter portions 60. The large outer diameter portions 60 and the small outer diameter portion 61 are made contiguous by inclined surfaces 6a, 6b, which are like the sides of a truncated cone. As shown in FIG. 5, the respective inclined surfaces 6a, 6b are arranged so as to correspond to positions 2a, 2b at which the sleeve 2 is caulked.

When the sleeve 2 of this brake hose with an intermediate coupling is caulked with a two-head caulking tool, forces $F_1$, $F_2$ for caulking the sleeve are transformed into forces $f_1$, $f_2$ by the pair of inclined surfaces 6a, 6b, the forces $f_1$, $f_2$ being directed away from each other. By the balance of these two forces $f_1$, $f_2$, the nipple 6 is moved to the regular position corresponding to the sleeve 2 even if the nipple 6 is slightly displaced because the nipple 6 has not been inserted to the regular position. Even after the sleeve 2 has been caulked, stresses remaining in the hose 3 at the two positions are received by the pair of inclined surfaces 4a, 4b, which are like the sides of a truncated cone, so as to confront the inclined surfaces, thereby preventing further movement of the nipple 6. Accordingly, the sleeve 2 interposes the hose 3 with the nipple 6.

Therefore, this brake hose with an intermediate coupling can also provide the same advantages as those of Embodiment 1.

As described in the foregoing in detail, the hoses with an intermediate coupling according to the present invention can optimally hold the nipple at the regular position corresponding to the sleeve by caulking the sleeve.

In addition, since the nipple is held at the regular position securely, there is no likelihood that the nipple will come off the coupling portion and sleeve, nor will the hose interfere with other parts fixed to the body of a motor vehicle.

What is claimed is:

1. A hose coupling assembly comprising:

a coupling portion including a hollow sleeve extending therefrom;

a hose having an intermediate portion thereof housed within said hollow sleeve; and a hollow, elongate nipple member disposed within said hose at a position generally corresponding to said intermediate portion of said hose, said nipple member comprising a first end portion, a second end portion opposite said first end portion, and an intermediate portion between said first and second end portions, wherein an external diameter of said first end portion and an end portion of said second end portion are substantially equal to one another and are different than an external diameter of said intermediate portion, wherein said nipple member includes a first tapered surface between said first end portion and said intermediate portion and a second tapered surface between said second end portion and said intermediate portion, wherein said hollow sleeve includes at least first and second crimped portions at positions substantially corresponding to the locations of said first and second tapered surfaces, respectively.

2. The hose coupling assembly as claimed in claim 1, wherein said external diameters of said first and second end portions are both greater than said external diameter of said intermediate portion.

3. The hose coupling assembly as claimed in claim 1, wherein said external diameters of said first and second end portions are both less than said external diameter of said intermediate portion.

4. The hose coupling assembly as claimed in claim 1, wherein said hose is resiliently compressible.

5. The hose coupling assembly as claimed in claim 1, wherein an angle of taper between said first end portion and said intermediate portion, and between said second end portion and said intermediate portion are substantially equal.

6. The hose coupling assembly as claimed in claim 1, wherein said at least first and second crimped portions restrain said nipple member from movement relative to said hollow sleeve.

\* \* \* \* \*